May 12, 1953 E. TOTH 2,638,540

BIASED SERIES-TYPE NOISE LIMITER AND SILENCER

Filed Oct. 31, 1947

Inventor
EMERICK TOTH

By M. A. Hayes

Attorney

Patented May 12, 1953 2,638,540

UNITED STATES PATENT OFFICE 2,638,540

BIASED SERIES-TYPE NOISE LIMITER AND SILENCER

Emerick Toth, Takoma Park, Md.

Application October 31, 1947, Serial No. 783,421

1 Claim. (Cl. 250—20)

(Granted under Title 35, U. S. Code (1952), sec. 266)

This invention relates generally to diode type noise limiting circuits for radio receivers, and more particularly to a circuit for opposing the internal potential of the noise limiting diode.

A study of diode characteristics reveals that the thermal emission of the heated cathode produces an equivalent internal potential of about 1.2 volts between cathode and plate in a diode such as the type 6H6, independent of any externally applied potential. Obviously a diode's internal potential will be more effective if the external potential is small but will be negligible in comparison to a large external potential. Accordingly, the influence of the internal potential varies with the relative magnitude of the external potential and hence the diode characteristics are non-linear except where the internal potential is negligible with respect to the external potential. Similarly, the internal resistance of a diode varies with the applied voltage.

Conventional noise limiting circuits of the series diode type generally provide a delay bias for the limiter diode which is controlled by the average amplitude of the incoming signal. Such circuits are usually designed to limit signal peaks exceeding a certain percentage of modulation. With this arrangement the circuit may be expected to limit at the desired level of modulation percentage irrespective of the average signal amplitude. However, in practice it is found that if the average signal is not large with respect to the limiter diode's internal potential, the limiter diode will have its threshold at a much higher level of modulation percentage than that for which it was designed. This is true since a signal peak must overcome the diode's internal potential as well as its delay bias in order to operate the limiter. If the average signal is large, the delay bias is large and the diode potential is negligible with respect thereto. However, if the average signal is small, the delay bias may be equal to or less than the diode potential and a signal peak may reach twice or more the desired level of modulation before it will operate the limiter. The limiter circuit will thereby be less effective just when it could be most useful, i. e., in the reception of weak signals.

It is therefore an object of this invention to provide a noise limiting circuit which permits operation of a limiter diode at the same predetermined level of modulation percentage during the reception of either strong or weak signals.

It is another object of this invention to provide a circuit for rendering ineffective the internal potential of a diode type vacuum tube.

Other objects and advantages of the invention will be apparent from the following description and accompanying drawings, wherein similar characters of reference indicate similar parts.

Briefly, this invention discloses a series diode type noise limiting circuit wherein a source of potential is applied to the noise limiter diode in series with its delayed bias voltage. Said source of potential is arranged in polarity so as to oppose current flow through the limiter diode. The source of potential may be increased in magnitude to operate as a squelch or silencer circuit.

Figure 1:
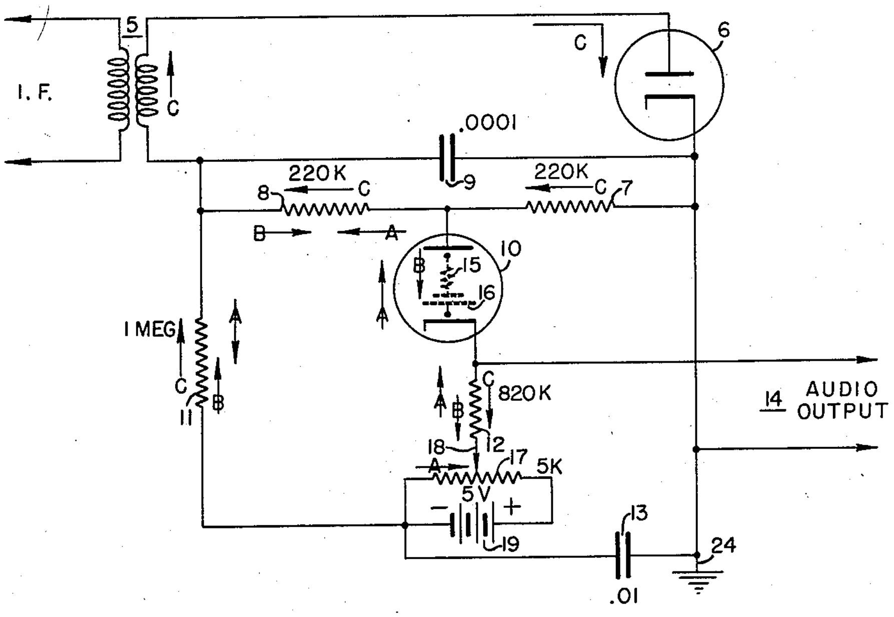
Fig. 1 is a schematic diagram of a preferred embodiment of this invention.

Referring to Fig. 1 in detail, a schematic diagram is shown of the demodulation section of a radio receiver. The demodulator is supplied with the signal voltage through I. F. transformer 5, the signal is detected by a detector diode 6 and the detected signal is developed across a pair of resistors 7 and 8 in series. The R. F. signal component is bypassed around resistors 7 and 8 through a capacitance 9.

The plate of a limiter diode 10 is tied to the junction of resistors 7 and 8 and the total rectified signal voltage developed across said resistors supplies the delay bias for the cathode of said diode through resistances 11 and 12, whose junction is bypassed to ground by a condenser 13. As indicated in the drawing, the respective value of components 11, 12 and 13 is such that the voltage at their common terminal will not follow audio frequency variations of the signal voltage. The audio signal output 14 is taken from the cathode of diode 10 across resistance 12 and capacitance 13.

The internal resistance and potential of limiter diode 10 is schematically shown in the drawings by a resistor 15 and a battery 16 in series with the plate and cathode. It should be noted that the positive side of the battery 16 is shown nearest the cathode. Using the conventional notation for the direction of current flow, the battery 16 will produce an extenral current from the cathode to the plate of diode 10 through resistances 12, 11 and 8. This current is indicated in the drawings by a series of arrows marked B.

A relatively low resistance potentiometer 17 is in series with resistance 12 and the junction of resistance 11 and capacitance 13. The series connection is arranged so that resistance 12 connects to the tap 18 of the potentiometer and resistance 11 connects to one end thereof. A battery 19 is in parallel with potentiometer 17 such that its negative terminal is at the junction of resistance 11 and capacitance 13. In the foregoing discussion elements 17, 18 and 19 have not been considered, it being assumed that these elements were eliminated from the circuit by adjusting tap 18 to the left end of potentiometer 17.

A potential which is equal and opposite to the internal potential of diode 10 may be introduced to the cathode circuit of said diode by moving potentiometer tap 18 to the right. The potential thus introduced will produce a current flowing from tap 18 through resistance 12, diode 10, resistances 8 and 11 and back to potentiometer 17. This current is indicated by a series of arrows marked A in the drawing. It will be seen that when the potential introduced by potentiometer 17 is equal and opposite to the internal potential of diode 10, their respective currents A and B will be equal and opposite and will effectively cancel each other. Thus, under these conditions the internal potential of diode 10 is balanced out within the circuit and will not have to be overcome by the detected signal before the limiting action may occur.

The detector diode 6 will also produce an internal potential, and although it is of less consequence, it produces a current through resistances 7 and 8 and through resistances 7, 12, and 11 and diode 10. The currents as produced are designated by a series of arrows marked C in the drawing. The current produced in resistance 8 is most important for here it effects the delay bias of the limiter diode. By properly setting tap 18 on potentiometer 17, the current A can be given just the proper amplitude to cancel currents B and C, thus a proper setting of tap 18 overcomes the internal potential of both the detector diode 6 and the limiter diode 10.

Figure 2:
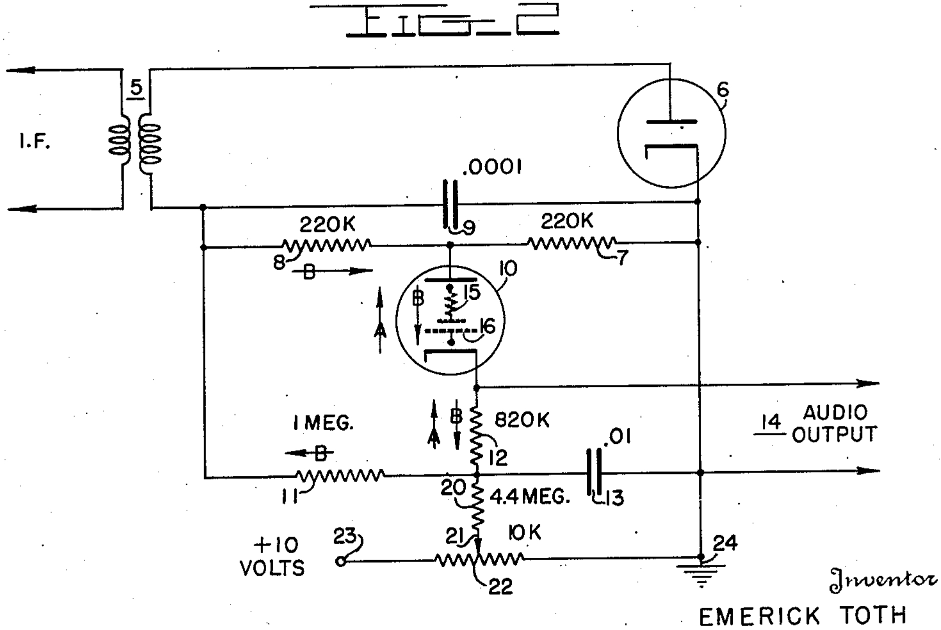
Fig. 2 is a schematic diagram of an alternate embodiment of this invention.

In Fig. 2 an alernative means for providing a bucking bias for the series limiter diode circuit of Fig. 1 is shown. Elements 17, 18 and 19 are omitted from Fig. 2 and resistance 12 is connected directly to the junction of resistor 11 and capacitance 13. To this junction is also connected high resistance 20 which couples the junction to a tap 21 on a potentiometer 22. The terminals of potentiometer 22 connect between a positive voltage source 23 and the common ground 24. By a suitable adjustment of tap 21, a bucking voltage equal and opposite to the diode's internal potential may be introduced to the circuit at the junction of resistors 12 and 11. The bucking voltage is coupled through the high resistance 20 in order to prevent potentiometer 22 from shunting capacitance 13 with a low impedance path.

The respective potentiometers of Figs. 1 and 2 may also be used to provide squelching or silencing action in the limiter circuit. By setting the taps of these potentiometers so that a substantial positive voltage is introduced to the cathode of diode 10, said diode will remain non-conductive until a sufficiently larger potential appears at the plate. With this arrangement the taps 18 and 21 respectively may be set so that diode 10 will not pass random background noise to output 14 in the absence of a detected signal. When a detected signal appears across resistances 7 and 8, a negative delay bias is introduced to the limiter cathode through resistances 11 and 12. If the detected signal is sufficiently large, the delay bias will overcome the positive bias manually applied to the cathode and the signal voltage will appear at output 14.

Although only limited and specific embodiments of the present invention have been shown and described, it may be modified without departing from the principles thereof and any such modifications are, therefore, deemed to be within the scope of the invention as defined in the appended claim.

The invention described herein may be manufactured and used by or for the Government of the United States of America for governmental purposes without the payment of any royalties thereon or therefor.

What is claimed is:

In a radio receiver, a demodulator comprising, detecting means including a first diode and a first impedance connected in series, an output terminal, a second diode serially connecting said output terminal to an intermediate point in said first impedance, an output load impedance having one end connected to said output terminal, a resistance-capacitance time constant circuit having its resistance leg serially connecting the other end of said load impedance to one end of said first impedance to supply the average level of the detected voltage to said second diode as a delay bias, a voltage source of higher potential than the combined contact potentials of said first and second diodes, a voltage divider connected between said voltage source and the other end of said first impedance, said voltage divider having a variable tap, and high impedance means connecting said variable tap to the junction of the resistance leg of said time constant circuit and said load impedance.

EMERICK TOTH.

References Cited in the file of this patent

UNITED STATES PATENTS

| Number | Name | Date |
|---|---|---|
| 1,966,047 | Ryall | July 10, 1934 |
| 1,990,782 | Greiback | Feb. 12, 1935 |
| 2,039,267 | Barber | Apr. 28, 1936 |
| 2,248,267 | Bacon | July 8, 1941 |
| 2,301,620 | Fowler | Nov. 10, 1942 |
| 2,518,449 | Coe | Aug. 15, 1950 |

OTHER REFERENCES

Cocking: The Diode Detector, Wireless World for February 3, 1938, pages 103 to 105.